Aug. 5, 1941.                H. K. NEUBER                2,251,546
                SOUND AMPLIFICATION METHOD AND DEVICE
                    Filed June 16, 1938          3 Sheets-Sheet 1

Inventor
Herbert K. Neuber

Aug. 5, 1941. H. K. NEUBER 2,251,546
SOUND AMPLIFICATION METHOD AND DEVICE
Filed June 16, 1938 3 Sheets-Sheet 2

Aug. 5, 1941.　　　　H. K. NEUBER　　　　2,251,546
SOUND AMPLIFICATION METHOD AND DEVICE
Filed June 16, 1938　　　3 Sheets-Sheet 3

Inventor
Herbert K. Neuber

Patented Aug. 5, 1941

2,251,546

UNITED STATES PATENT OFFICE 2,251,546

SOUND AMPLIFICATION METHOD AND DEVICE

Herbert K. Neuber, Philadelphia, Pa.

Application June 16, 1938, Serial No. 214,166

23 Claims. (Cl. 177—7)

My invention relates to devices for reproducing and amplifying the vibrations of metallic objects producing musical sound.

My invention is applicable to the vibration of various nonmagnetic bodies capable of producing musical tones but finds one of its most useful embodiments in amplification of the tones from tubular chimes.

One of the purposes of the invention is to confine the amplification of sound to amplification of the vibrations from a selected portion of the vibrator which produces the sound amplified, thus avoiding undesirable overtones.

A further purpose is to amplify sound through the medium of the coincident physical distortions of an electrically conducting vibrator from which the sound emanates, and thus to avoid concurrent amplification of physical movements from or of other parts of the conductor and of sound exterior to it.

A further purpose is to convert the physical movements of a musical vibrating electrical conductor into electric current within the conductor, having the periodicity of the musical vibrations, to use the conductor as the primary of a transformer, to form a transformer secondary adjacent to the primary and to amplify as sound the electric currents within the secondary.

A further purpose is to reproduce electromagnetically and amplify the true tone of a chime without distortion due to the setting in which the chime is placed, and comparatively free from objectionable overtones.

A further purpose is deliberately to avoid reproducing all of the overtones of a chime by selection of the position along the length of the chime covered by the coil and the extent of the length of the chime occupied by the coil.

A main purpose of the invention is to amplify chimes without acoustical feed back and without amplifying the detrimental sounds in the surrounding territory such as voices, ordinary room resonance, etc., permitting, for example, amplification of chimes almost wholly free from any music of an associated organ.

A further purpose is to use the vibrations which produce sound in electrically conducting vibrators, and not the tones themselves as the basis for reproduction and amplification of the tones of the chimes, recombining in permissibly the same high gain amplifier through electric circuits about or parallel to the surfaces of the vibrators.

A further purpose is to apply a permanent magnet, about, if a toroidal magnet, or nearly against a nonmagnetic metallic musical vibrator which is struck or otherwise energized and to pick up by induction in a surrounding coil or pancake coil, for example, and then greatly amplify electrical currents produced in the vibrator as a conducting medium.

A further purpose is to provide an amplifier for a chime or other electrically conducting musical vibrator comprising a toroidal magnet adapted to surround the vibrator and providing a coil between the toroidal magnet and the vibrator, which coil is connected to a high gain amplifier in which amplification of the sound of the chime takes place.

A further purpose is in energization of a high gain amplifier from chimes through a toroidal magnet about each individual chime and a coil between the magnet and the chime itself, determining the tones and overtones to be reproduced by the pick-up coil i. e., by the position of the coil along the length of the chime.

A further purpose is to provide a single amplifier and a plurality of chimes, separately supplying energization to the amplifier from each of the chimes by a coil which is individual to it.

Further purposes will appear in the specification and in the claims.

My invention relates not only to the processes or methods involved but to mechanisms by which these methods or processes may be carried out.

I have preferred to illustrate my invention by a few only of the forms in which it may appear, selecting forms which are practical, and effective, and highly desirable, but which have been chosen primarily because they so well illustrate the principles of the invention.

Figure 1 is a side elevation, partly in vertical section and partly diagrammatic, showing a tubular chime and a pick-up device, with amplifier and loud speaker systems which may be used in practicing the invention.

Figure 1a to 1e are fragmentary views related to Figure 1 but showing alternative constructions.

Figure 2 is a section of Figure 1 taken upon line 2—2.

In the drawings similar figures indicate like parts.

Describing in explanation and not in limitation:

Amplification of sound given off by magnetic metallic musical vibrators has proved to be comparatively easy because of the magnetic properties of the vibrator.

Various efforts have been made to amplify the sound given off by nonmagnetic metallic musical vibrators such as, for example, chimes and bells. These have been largely, if not entirely, directed to amplification of the sound from the vibrators, as sound, and have been subject to all of the defects inherent in such instruments. Thus, there has been amplification also of any conversation had in the neighborhood of the instrument, of the sounds of other instruments accompanying that to be amplified and of all overtones and reflections from the instrument. The amplification of the overtones and reflections become objectionable, of course, where it is desired to select and amplify those tones only for which the instruments have been designed.

For the reason that tubular and bar chimes comprise embodiments of the invention which are very well suited to illustrate the invention, it will be described chiefly in its application to the chimes, pointing out, however, that the same principles which apply to the use of the invention in reproducing and amplifying the sounds of chimes are applicable to reproduction and amplification of the sounds of a large variety of other electrically conducting musical vibratory media.

The difficulty in amplifying the tones of chimes because the metals from which the chimes are made are non-magnetic is effectively true even when the chimes have been coated with a thin layer of a magnetic metal such as nickel.

In order the better to understand the principles of my invention a brief analysis of the physical action of chimes will be helpful.

In the section where a tubular chime is struck, the circumference is deformed (decreased) and compression is set up. The section immediately tends to restore itself to normal conditions and therefore expands, not merely to normal condition but beyond this. Due to the inertia of the metal particles of the chime, the metal stretches beyond normal and produces tension. Compressions and tensions may take place coincidently, a compression at one part and a tension at another part of the circumference of the chime causing the chime to oval and the major axis of the oval varying in angle about the circumference as the sound continues. These compressions and tensions are repeated alternately with decreasing amplitudes until the energy applied has been expended and the section again assumes normal conditions.

These alternate compressions and tensions in the energized section successively travel as waves to other sections of the tube. These waves travel lengthwise of the tube. Since the tube is ordinarily struck at the top, near where it is supported, this means that the travel is downward toward the free end.

When the downwardly traveling waves reach the lower end of the tube, they are reflected and returned upwardly, combining with waves coming down to produce what is termed a standing wave or stationary undulation.

The maximum displacement in the tube, due to a standing wave, occurs of course at the section or in the sections where the greatest combination of the transverse movements of the downwardly and upwardly moving waves occur and operate in the same direction. Likewise, there is a substantially stationary condition of the extent of vibration, a zero, at the point where the downwardly and upwardly traveling waves are equal and operate oppositely in direction. These latter points are called nodes of the standing waves, and the points of the highest wave amplitude are the antinodes.

When a tubular chime is struck, standing waves of the fundamental and of its overtones are produced. Each of these has nodes and anti-nodes, at different distances along the length of the tube. The location of the nodes and anti-nodes for the fundamental and for the different overtones are not the same, for one tone or overtone as for another.

The chime has been designed, of course, for its fundamental and those seeking amplification are interested normally in as realistic a tone as possible. They are interested in the fundamental tone rather than in the undesirable overtones but it must be understood that for true definition certain desirable overtones must be included. What is heard as sound, and what was amplified in the past through the medium of a microphone is and was a merging of the fundamental and all overtones and reflections.

All of the sound was taken together and if the chime was played in connection with an organ, for example, it was difficult not to reproduce also the tones of the organ along with those of the chimes.

The present invention has been directed to the reproduction of the sound by making use of the vibrations in the chime or other vibrating metal at a selected point or points, for example, where the tone is that for which the chime was designed or constructed, with closely related overtones, while freeing the chime from reproduction corresponding with the vibrations of other parts of the length of the chime.

The amplification is based upon the vibration of the metal of the chime within a magnetic field.

The current to be amplified is secured by taking advantage of the generation of an electrical current which takes place whenever a metal body moves in a magnetic field.

The action is comparable to the normal armature action in a generator. Current flows in the armature coils because the armature coils moving through magnetic flux cut lines of magnetic force and as the number of lines of magnetic force included increases, the current is generated in one direction while as the number of lines of magnetic force included is reduced the current is generated in the opposite direction. Instead of rotating the armature "coil" or loop through the field of force, the movement of the armature is here effected by the swelling and retraction of that part of the metal walls of the chime which lies within the field of magnetic force.

Because the generation of the current results from the vibratory movements of the chime walls, the currents generated in the chime have the period of chime vibration. They flow circumferentially through the band or ring of the chime within the magnetic field. This band therefore acts as a single turn loop armature and the currents generated circumferentially in it are capable of being applied as a primary to induce currents in a separate coil of one or many turns acting as secondary. Because it is desired to increase the voltage and to spread the secondary coil over substantially the same length of the chime as the band which is serving as primary, the secondary (pick-up) coil contains many turns. It preferably lies quite close to its primary—as close as may be without danger of it or the associated structure dampening the vibrations of the chime. The secondary (pick-up) current is then carried to any suitable amplifier and afterward converted into sound in a loud speaker.

Figures 1, 1A, 1B, 1D, 2, 10:
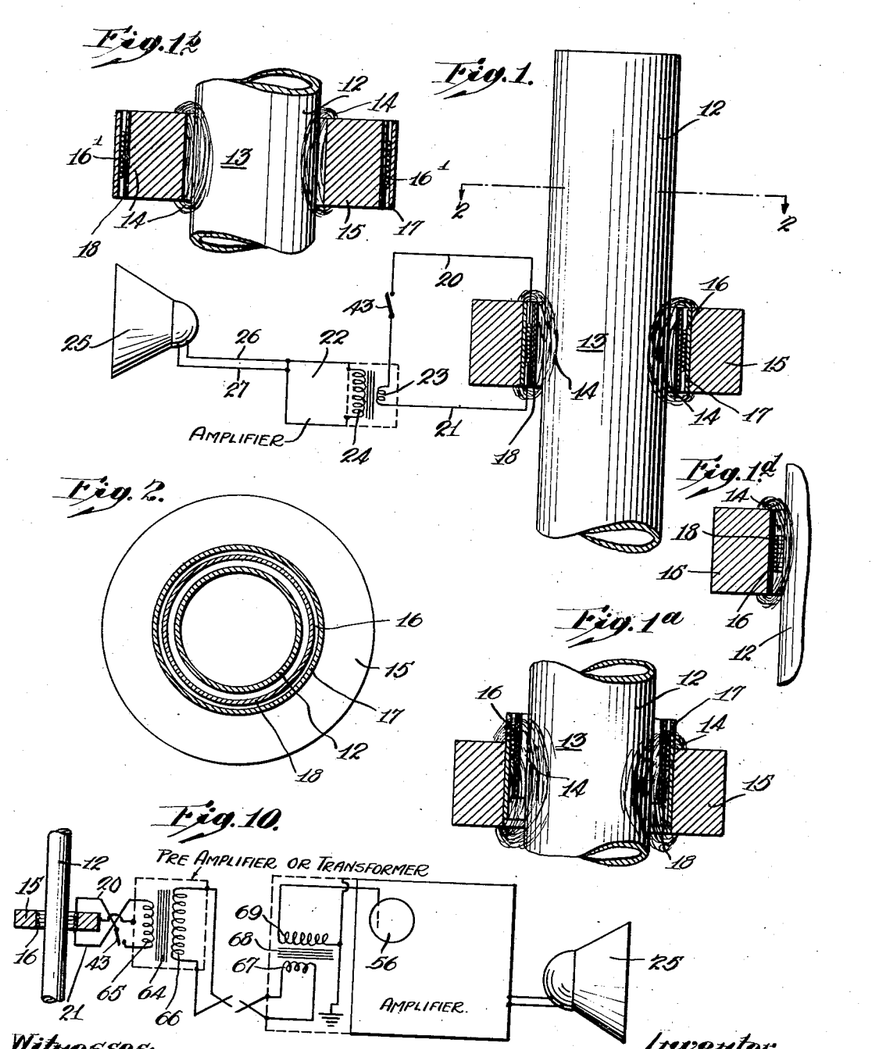

In Figures 1, 1a, and 1b the vibrator, such as chime 12, is supported in any suitable way, not shown in these figures. It is desirable that the tone at some such point as 13 be amplified. For present purposes it does not matter whether the tone be a fundamental or an overtone, nor whether the point be an anti-node or have some intermediate rate of vibration, except that maximum vibration will yield a correspondingly larger current for amplification. From the standpoint of the sound produced it makes a great deal of difference, of course, in the purity of tone and in the tone whether the reproduction be made from the vibrations at a fundamental anti-node or some other point along the length of the chime.

At the point 13 a field of force 14 is set up. This could be attained by an electromagnet but preferably is secured by a permanent magnet. For tubular chimes toroidal magnets such as 15 have given excellent results. The field of force is lightly indicated by a few lines only, extending in planes generally lengthwise of the chimes.

Because a toroidal magnet is surrounded by a field of force which is substantially the same depth toward the ring center at all points about the toroid, this field of force becomes in itself toroidal. It is more intense close to the interior ring wall of the toroidal magnet than farther in toward the center of the ring and the lines of force between one face and the other extend generally longitudinally of the ring as loops in planes through the axis. This field of force for convenience is referred to herein as toroidal.

The toroidal magnet is preferably as close a fit to the chime as is consistent with the location of secondary coil 16 between the magnet and the chime. This is desirable in order that there may be as strong a field of force through the space within as possible. There must be room, of course, also for suitable insulation, 17, which may be of soft texture fiber. It is desirable to avoid use of an insulation which is rough to the coil as a coil of very fine wire can be used if it does not require rugged insulation. The dielectrical properties are not critical. The spacing, thickness, and character of insulation may be made such that the coil will be held in place by friction of the coil against the insulation and of the insulation against the magnet.

The secondary (pick-up) coil 16 is wound upon a rigid form 18. Mica gives excellent results.

The secondary coil 16 and its mica form should lie as close as may be to the chime without being touched by it. Contact would damp the chime.

When the chime is struck, the vibration of the chime at the point selected causes the chime to swell and contract within the field of force, cutting the lines of force in one direction and then the other as the chime swells and contracts.

Because the chime is a conductor of electricity, it acts as an armature and the cutting of the lines of force in one direction and then the other causes current circumferentially about the chime in opposite directions. This current bears relation, of course, to the strength of flux in the field of force and has a frequency corresponding to the frequency of the physical pulsations of the chime at the point selected.

The minute current thus produced in the chime is transformed through the secondary (pick-up) coil 16 into electric currents, secondary to the currents in the chime as primary, whose period, volume direction, and other characteristics are determined by the period, volume, direction, etc. of the physical vibrations and of the current in the chime.

The electric current induced in the pick-up coil 16 is connected by any suitable conductors such as 20 and 21 with an amplifier 22. In the present case this connection is shown as direct, the connection being made with the primary coil 23 of a transformer having secondary coil 24, intended to be typical of amplifiers, of which there are a great many capable of amplifying the feeble currents generated in the pick-up coil. My invention is not concerned with the specific type of amplifier used other than that it shall be capable of augmenting the current from the pick-up coil sufficiently to operate a loud speaker 25.

This loud speaker 25 is also intended to be typical of loud speakers connected in any suitable manner as by wires 26 and 27 with the amplifier and capable of converting the alternating currents (electrical energy) provided by the amplifier into acoustical energy or sound.

The invention is applicable whether the amplification takes place wholly in one composite unit or, for example, in several units, such as by a pre-amplifier and a power amplifier, the one located at the point at which the music is picked up and the other at the delivery end. If the connection from the pick-up coil be direct, i. e., to a single unit amplifier, the input impedance of this (high gain) amplifier must naturally match the impedance of the pick-up coil; but if the amplification is to be made in two or more units, the impedance of the pick-up coil in a two unit construction, must match the input impedance of the preliminary amplifier and the output impedance of the preliminary amplifier must the input impedance of the power amplifier.

Let it be understood that individual amplifiers, single or in multiple units, can be used for each individual chime or each individual coil on a chime for the purpose of obtaining desirable tonal effects.

The selection of whether the amplifier be a single one, of high gain type, or composed of a pre-amplifier and a power amplifier must be left to the discretion of the engineer in the individual case since it depends upon the design of the complete unit including such factors as the impedance of the pick-up coil, the impedance of the input of the amplifier, the number of chimes, and hence the number of pick-up coils which are to be connected in parallel and the distance between the pick-up coils and the amplifier and the loud speaker units.

As later disclosed, for purposes of completion of the invention I give a few practical connections illustrative of the interrelation of these parts from among a very large number of interrelations which might be used.

If attempt be made to pick up very nearly pure fundamental tones without overtones the magnet used would have to be very narrow indeed, and in an individual case it might not be desirable to do so since a suitable range of overtones may be necessary to give the proper timbre to the tone.

The magnet is illustrated as located opposite the antinode of the fundamental. Adjustment will vary the proportion of fundamental and overtones secured. The fundamental and the overtones have their antinodes at different points along the chime length and have different frequencies. Axial movement of the toroid magnet increases the prominence of some tones or overtones and reduces others.

Seldom will it be desirable to use a single chime. Ordinarily chimes are used in sets and the sets may contain as many as 30 or more individual chimes. As many, perhaps all, of these chimes are to be amplified through a single amplifier and loud speaker system, the tone's intensity or volume of the chime's amplification from the individual chimes will have to be considered in their relation to each other.

Adjustment of the toroidal magnet along the length of the chime has been shown to affect the reproduction of the individual chime.

The volume produced from the chime in the illustration is also subject to adjustment as seen in Figure 1a by partial withdrawal of the coil 16 from the central position within the magnet seen in Figure 1. This partial withdrawal acts to reduce the coupling of the pick-up secondary coil 16 with respect to its primary, the current within the chime, operating as in all transformers to reduce the current in the secondary as compared with that in the primary. In individual cases the pick-up coil may be a coil 16¹ about the outside of the toroidal magnet as shown in Figure 1b giving a very much reduced inductive effect between the chime primary and this coil 16¹ as a secondary. The coil 16¹ is, of course, further capable of movement axially along the outside of the toroidal magnet. As to both the coil 16 and 16¹ there is, of course, also opportunity for variation of the voltage by substitution of coils having differing numbers of turns to the individual coils.

Either total volume of reproduction or the volume of any segregable part of a reproduction system may be controlled by the very well known expedient of using a volume control. This is applicable to any of the figures showing circuits and for purpose of showing one illustration of it, has been inserted in Figure 7. There is no novelty in this in itself and no need of the use of the particular form of volume control there shown. Nor need it be positioned in the circuit as there seen. In effect the volume control 19 is nothing more than a variable resistance or potentiometer in the grid circuit.

Figure 7:
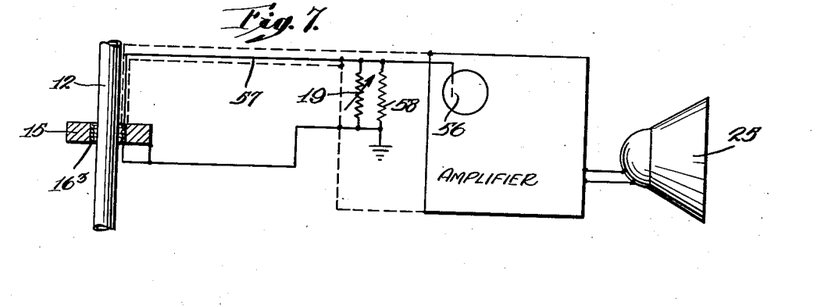
Figures 7–10 are fragmentary vertical sections corresponding generally to Figure 1 with diagrammatic connections to amplifier and loud speaker systems, respectively.

It is recognized that the position for this volume control 19 of Figure 7 is not the most desirable position for it and that it would be more advantageous to insert it after the first stage in an amplifier.

These several adjustments of the position of the magnet along the chime, to alter the tone and the overtones included, and the differing effects to be secured by altering the position of the coil 16 or using coil 16¹, give great flexibility of adjustment of the combined reproduction from the many chimes.

It will be noted that in its broader aspects my invention has to do with the production of the electric current within the secondary (pick-up) coil, with the capacity for selection of the rates of vibration of the chime or other instrument whose thus selected tone is to be reproduced and amplified, and with the variation or adjustment of the extent of amplification of individual chimes or other instruments as affecting those of other chimes, etc., in the amplification of an entire group of instruments more than with the treatment of the current so produced to augment it electrically and then to convert it into sound.

The tone characteristics of even widely separated sections of a single chime 12 can be combined, amplified and reproduced by the simple expedient of using two magnets 15, 15¹ with separate coils 16, 16¹ in parallel (Figure 1c) connected by conductors 20, 21 with an amplifier not shown.

The construction at the chime, the connections between, whether to a single high gain amplifier or to a transformer and amplifier or to a pre- and a power-amplifier can follow any of the disclosures regarding the rest of the forms in this application, the thought being that new combinations of sounds from parts of an instrument can be effected, permitting a character of sound such as could never be heard from the instrument itself, selectively combining desirable portions of the sound from the instrument and ignoring undesirable intervening portions.

In Figure 1d I have shown the same form of pick-up coil 16 as in Figure 1 but inside the mica 18, the mica frictionally engaging directly against the magnet and being adjustable along the magnet axis as in Figure 1a. The coil frictionally engages the inside of the mica and may or may not be protected by insulation between the coil and chime such as is seen in Figure 1a.

Figure 3:
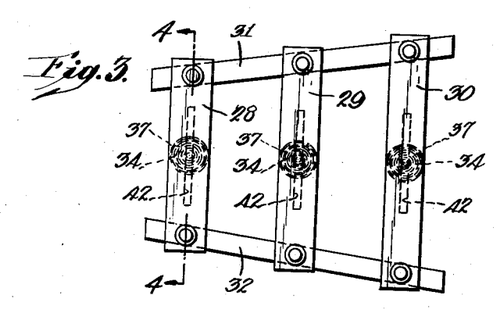
Figure 3 is a top plan view of a three-bar chime embodying my invention.
Figures 4, 4A:
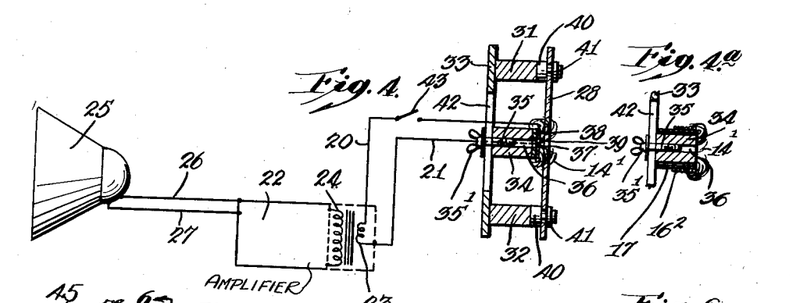
Figure 4 is a section taken upon line 4—4 of Figure 3, with diagrammatic amplifier and loud speaker connections.
Figure 4a is a fragmentary section corresponding generally to Figure 4, but showing a modified form.

In Figures 3 and 4 the invention is shown as applied to musically vibratory nonmagnetic metal parts in a flat bar chime.

The same connections with a typical amplifier and loud speaker are shown as in Figure 1.

The mechanism is suitable for application to bars, bells, nonmagnetic metallic reeds, etc., where a vibratory face of a nonmagnetic electrically conducting part is available as a generating body.

The individual chime bars 28, 29, and 30 are supported upon suitable rails 31 and 32 so as to vibrate to the best advantage, responding to actuating blows. The rails rest upon a base 33 which in the illustration supports also magnets 34. The magnets are held to the base by wing bolts 35. Because of the convenience of holding by the bolts, the magnet shown is centrally apertured at 36.

The preferred form of pick-up coil for this type of magnet is the pancake spiral coil 37. It is spaced from the magnet by insulation 38. The spiral coil is located close to its individual bar, but far enough from it to prevent damping contact. The lines of force 14' are of general mushroom character.

The electric currents generated in the chime bars by vibration of the bars and consequent cutting of lines of force in one direction and then the other are induced within the pancake coils and are amplified and converted into sound as in the case of the secondary currents within the pick-up coil of Figure 1.

The cyindrical form of magnet shown in Figures 4 and 4a lends itself also to use with a winding $16^2$, being spaced from the magnet by insulation 17, as in the case of Figure 1b. It is adjustable along the length of the magnet.

The pan cake spiral coil 37 can be mounted upon any suitable support such as plug 39 so as also to be adjustable (between the magnet 34 and the vibratory bar), axially toward and away from the bar, giving adjustment of the extent of current induced in it, corresponding generally to the adjustment of the current induced within the pick-up coil 16 by movement of this coil 16 along the length of the chime but without moving the toroidal magnet.

Between the rails and the above bars are located insulating media 40 and 41 for the bars.

It will be seen that the form of Figures 3, 4, and 4a, typical of amplifying systems for musically vibrating surfaces which are not conveniently capable of being surrounded by cylindrical coils, is capable of adjustment as to extent or volume of amplification by adjustment of the pancake or cylindrical coil toward and away from the surface of the bar or other musical element whose tone is being amplified.

In bars and other like devices whose music is to be amplified, the rate of vibration differs at different points along the length of the bar, similarly to the differences in rate of vibration along the length of a tubular chime; with the result that the fundamental chiefly, along with some overtones, or overtones chiefly securable at other points along the length of the bar, may be amplified as desired. In this form of the invention selection may be made, as to fundamentals or overtones which are chiefly to be amplified, by adjustment of the position of each magnet along the length of its individual bar. This adjustment is taken care of by having the head 35' of the wing bolt capable of clamping the bolt in any position along the length of the slot 42 in base 33. In whatever position the magnet is placed the bolt tightens the magnet against the base on one side and the bolt head on the other, retaining the parts in position.

Both of the generic forms thus far illustrated are therefore capable not only of amplifying the musical tones and overtones desired but are capable of adjustment as to the selection of tones and overtones amplified and, as to the strength of amplification, provide desirable means for adjustment of the composite music produced from whatever individual chimes or other devices which are used coincidentally.

The pancake coils of the bar chime form lie between parallel planes because the adjoining surfaces of the bars are flat; but can be bent to conform generally to the adjoining surface of the vibrator where this surface is, for example, a bell, whose surface is not flat.

With the present invention many effects can be produced. Some are:

The vibrations may be amplified and converted into sound.

By the use of a switch 43, whose blade may be an additional contact on an instrument key, the pick-up coil circuit may be closed during the pressing of the key only and be cut off afterward. This gives sharp definition of the tone which is cut off immediately, not because the bell has stopped vibrating but because the switch has cut off the amplification. Many chimes now linger too long and should be reduced in time rather than prolonged, which is especially true on rapid musical passages. I am assuming at the moment that the chimes or bells are in a separate chamber where they would not be heard through the air and that therefore I can control the sound completely by the reproduction.

The tone can be amplified and part of the amplification can be used regeneratively (as by a special loud speaker $25^1$ Figure 1e) in a special sound box 44 for the chime or for the set of chimes; in which case the vibration in the sound box due to the loud speaker and caused by one particular chime will be picked up largely by that chime.

The effect upon other chimes is negligible as this regeneration reproduces and resonates that mainly which has been received from the first chime and the effect of the first chime will be continued longer than would otherwise be the case.

The loud speaker $25^1$ may receive a part only or all of the current from the amplification. The vibrations produced by it are picked up sympathetically by the chime and cause the chime to continue its sound, much the same as a pendulum is given a little touch at each end of its stroke without which it would die down. In effect we have a resonant feed back which is applied to the chime and by which the vibration of the chime could be continued indefinitely provided sufficient energy were fed back.

A conventional form of volume control is shown in Figure 1e and can be used to control the amount of regeneration at $25^1$.

Figures 5, 6:
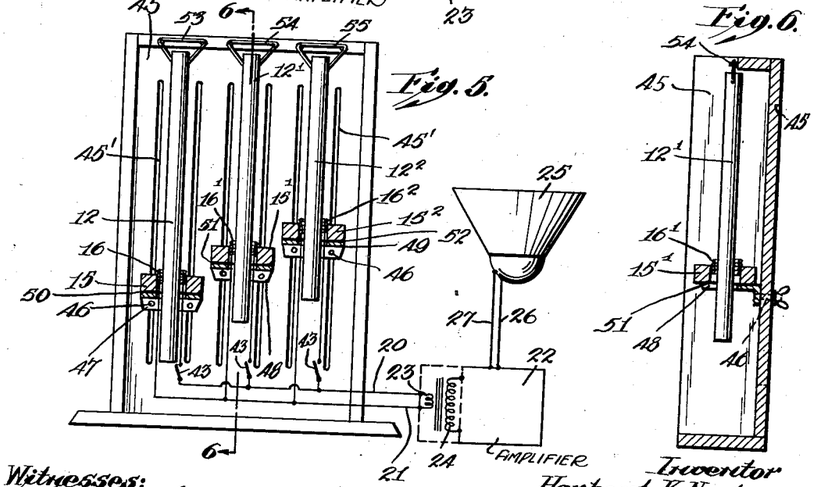
Figure 5 is a front elevation of a plurality of chimes, magnets, and coils about the chimes and a mount for the magnets, upon which they can be adjusted along the lengths of the chimes to secure different effects from the individual chimes. Diagrammatic connections lead to an amplifier and to a loud speaker.
Figure 6 is a fragmentary section of Figure 5 taken upon line 6—6.

For convenience of support and movement of the parts in initial adjustment of the chimes, one with respect to another, I show diagrammatically a support 45, Figure 5, supplementally slotted at $45^1$ in order that bolts 46 may be passed through the support to hold to it brackets 47, 48 and 49.

The diagrammatic background and variable support is shown for the reason merely that I found such a background convenient in my study to provide selective tuning and secure the overtone effects most suitable with magnets such as 15, $15^1$ and $15^2$.

The magnets 15, $15^1$ and $15^2$ are preferably permanent magnets and are toroidal. There are on the market at the present time toroidal magnets of this type made of various aluminum nickel alloys, some of which contain cobalt, and these are quite effective for the purpose, but it will be understood that any suitable magnetic alloy may be used.

As the physical vibration of the magnet itself is not necessary to my invention, and may be objectionable, I have shown the magnets as damped against physical vibration by cushioning material 50, 51 and 52.

The chimes 12, $12^1$ and $12^2$ are supported at 53, 54 and 55 and the magnets and coils are supported at various heights along the chimes. The currents from coils 16, $16^1$ and $16^2$ are carried to the same input primary 23 of a high-gain amplifier transformer having a secondary 24. The loud speaker is shown at 25.

In operation, with the present invention, no reliance is had on the audio acoustical manifestations and the pick up is non-audio-acoustic, relying upon the vibrations causing audible manifestations. The function may be termed magneto-acoustic because the electric currents are generated by the nonmagnetic musical vibrator acting as an armature moving within a magnetic field.

The portion of the chime whose vibration is amplified and reproduced in sound is closely segregated and may be limited to a narrow range of frequencies of vibration. This control of the frequencies can be used, for example, in providing a purer tone or in emphasizing any other characteristic by which the vibrations in one part of the length of a vibrator, such as a chime, differ from the vibrations in another part thereof.

The amplified sound faithfully portrays the vibration of the selected part of the chime even though a group of chimes be closely associated. At the same time it permits isolation of the individual chime tubes in separate enclosures so that any partial, fundamental or combination of partial and fundamental, or other blending of overtones generated within an individual chime tube may be realized and a group of these amplified reproductions may be combined through the same or different amplifiers or loud speakers securing the desired combinations while avoiding sympathetic effects even of one chime upon another when they are close together.

A single chime is, of course, useful as a call bell; but where a number of chimes are to be used together—the usual situation—adjustability of the position of the secondary (pick up) chime coil makes it possible to adjust the relative volumes of sound from the different chimes and permissible adjustment of the height of the toroidal magnets permits variation in the tones reproduced from the individual chimes. These two adjustments in volume and tone give a flexibility of combination of the chimes not heretofore attainable.

For the first time the tones of the chimes being amplified can be freed from interference by associated or extraneous influences and can be selected to reproduce a portion of the chime sound rather than the entire range of the sound produced. It is thus possible also to adjust the relative volumes of sound amplification from the individual chimes notwithstanding that amplification takes place through the same amplifier and the same loud speaker.

In extreme cases where the tone of one chime is relatively loud, the inductor coil comprising the chime secondary may be removed largely or entirely from the space within the toroidal magnet and separately supported or a coil 16$^1$ may be placed as in Figure 1$b$ about the outside of the toroidal magnet.

In the case of the flat bar chime shown in Figures 3 and 4 the magnet will normally be much smaller in diameter than in the earlier figures and can be solid or tubular as preferred. The adjustment will here be parallel with the length of the bar which in this case is transverse to the magnet and again a choice may be made of the portion of the length of the bar whose vibrations are to be produced, selecting the fundamental or the overtone or such combination of fundamental and overtone as proves desirable for the individual chime which is being considered.

Here again, though the chimes and magnets utilize individual pick-up coils, this does not require that they shall have individual amplification nor that they operate through different load speakers. On the contrary, they will ordinarily operate in parallel with the same amplifier and the same loud speaker.

If desirable, here as with Figures 1, 1$a$, 1$b$ and 2, the treatment of the individual connections between the coils and the amplifier may be different for one coil or set of coils than that for another set.

It is not essential, of course, that the coils of Figures 3 and 4 shall be pancake coils, as coils of the character of those in Figures 1, 1$a$ and 1$b$ could be used with the flat chimes. Preferably, if cylindrical coils are to be used, they should be of the 1$b$ type, that is, they should surround the outside of the magnet used.

The details of the selection of the impedance of the chime secondary coil, matching its impedance with that of an input transformer primary or of the input grid of a high gain amplifier, the type, characteristics and location of a transformer or of transformers, if inserted, and other features by which this secondary current may be amplified and converted into sound may be left to the judgment of the designer in view of the information given herein. They are of much less importance than that broader part of the invention, which comprises transformations of vibrations evidenced by the expansions and contractions of the nonmagnetic vibrator into electric current to be amplified and subsequently to be converted into sound.

Moreover, the number of known amplifiers, preamplifiers, power amplifiers, high gain amplifiers and loud speakers and combinations among them is very great.

The question of whether low impedance shall be used in the secondary coils, to avoid picking up induced currents in the input leads to the amplifier which would distort the reproduction, and then stepping up to match with the grid of the first audio tube in a high gain amplifier, or whether higher impedance shall be used at the start, or shall use an input transformer adjacent the high gain amplifier system with or without previous step up of the secondary current, or whether a pre-amplifier need be used at the source and similar questions are primarily for determination by men skilled in the art of amplification and sound reproduction of currents having the characteristics of those produced by me. So many arrangements are possible, each of a great variety capable of accomplishing good results provided the parts be designed to match each other, that no attempt will be made to give a complete showing of such combinations.

Because I have felt that it was desirable to show some wiring connections from the secondary coil to a loud speaker or other sound producing mechanism and wish to give concrete evidence that there is a variety of ways in which the amplification and transition into sound can be secured, I have illustrated in Figures 7–10 four sets of connections among many by which this can be done.

Figures 8, 9, 10, 11:
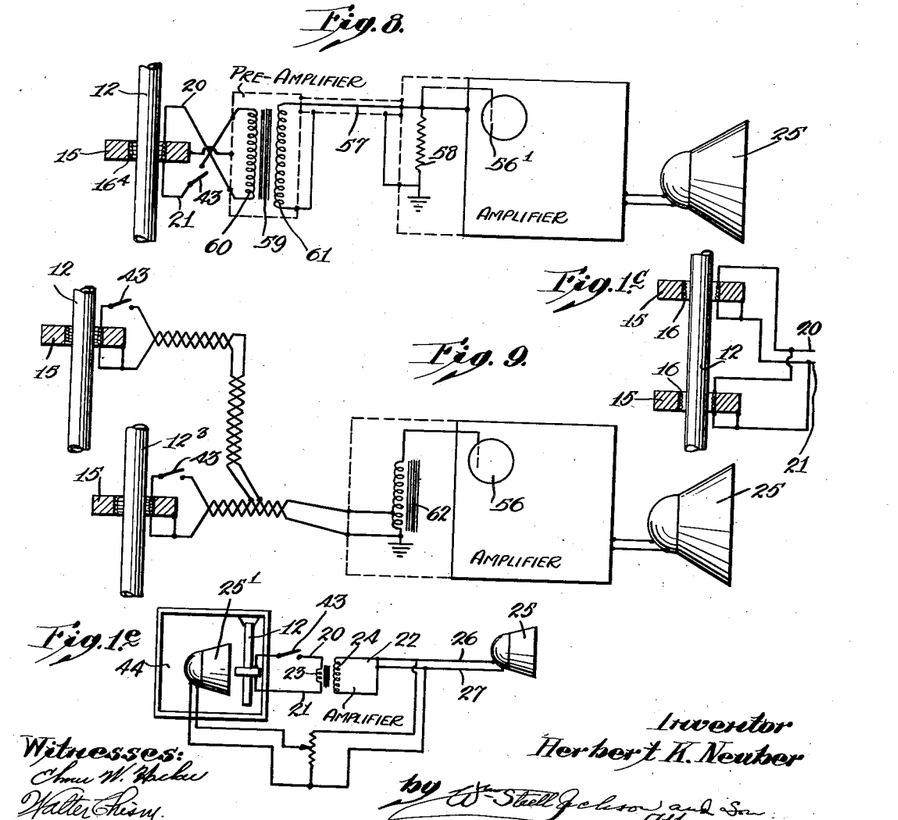

In Figures 7, 8, and 10 one chime, magnet and coil are shown. Two appear in Figure 9.

In Figure 7 a high impedance pick-up coil 16$^3$ is shown which may be, say 2000 ohms to 100,000 ohms. It is matched in impedance with the grid 56 of the first tube of a high gain amplifier. The low capacity shielded transmission line 57, load resistance 58 and loud speaker 25 are conventionally shown. For example, the loud speaker may be electro-magnetic, permanent field dynamic, electrodynamic, electrostatic, crystal, etc. and the resistance 58 may be of the order of several hundred thousand ohms to several million ohms.

The magnet and the shield for the low capacity transmission lines shown are all indicated as grounded.

A high impedance pick-up coil such as above is fully operative but is in danger of picking up undesirable induced currents.

In Figure 8 the coil 16⁴ is a low impedance coil, for example five hundred ohms or less. The voltage is stepped up by a transformer 59 having primary 60 and secondary 61 so that the secondary impedance will match that of the grid 56¹. The connections from the transformer to the amplifier and to the loud speaker are shown like those in Figure 7.

Instead of the transformer 59 shown in Figure 8 a pre-amplifier could be used of which the transformer might form an integral part.

When a low impedance pick up coil is used in a chime which is one of a group of chimes, it is desirable to pass the connections to the input tube grid of the amplifier through a transformer in order to properly match the pick up coils from the chimes connected in parallel.

With low impedance coils there is little danger of picking up undesirable high frequencies and all of the low impedance coils are then connected to a transformer or transformers through which they are stepped up to match impedances with the grid of the first audio tube or tubes in the amplifier. The form shown in Figure 8 is therefore not so much desirable in itself if this would be the only chime—as would very seldom be the case—but is a construction suited to grouping individual chimes with other chimes.

In Figure 8 the resistance across from the transformer secondary to ground matches the impedance of the secondary of the transformer, the impedance of the primary of the transformer matching the impedance of the pick up coil about the chime.

In Figure 9 two chimes 12 and 12³ are shown. Their pick up coils are connected in parallel with an input transformer 62 for the amplifier system, which input transformer is shown as an auto-transformer. It would not be uncommon to use a tap transformer for the auto-transformer in order that the tap might be changed to match in impedance the combined resistance of the system. For example, it would be different with a single four hundred ohm pick up coil from that which would be required if we had two four hundred ohm coils from different chimes in parallel. The other connections, twisted pair transmission line, grounding, amplifier and loud speaker are conventional.

The chimes would be used normally in groups of anywhere from three to thirty and the difference in the resistance of the circuit according to the number of chimes and the resistances of their pick up coils must of course be taken care of in matching to a transformer or to the input of an amplifier.

The construction of Figure 10 provides for a considerably longer line between the chime system and the amplifier than do the other constructions. In Figure 10 there is a transformer 64 at the chimes receiving its current from and having its primary coil 65 matching the impedance of any number of chimes. The secondary 66 is connected with and matches the primary 67 of an input transformer 68 adjacent the high gain amplifier system. The secondary 69 of this input transformer, of course, matches the grid of the voltage amplifier.

It will be evident that the impedance of the secondary chime coil can be made high or low or intermediate without affecting the principle of my invention; subject, of course, to matching the impedance of the coil in the transformer or the input connections of an amplifier.

It will be evident that any considerable removal of the amplifier system from the pick-up coil makes it desirable to use a low impedance pick-up coil and transmission line.

It will be evident that the present invention will find use not only in complete chime systems, such as are used in organs, for example, but also in reproducing and amplifying smaller sets of chimes and individual chimes wherever used, such for example as chimes present in clocks and signaling devices.

It will be evident that the extent of amplification of the feeble currents generated by and in the armature is an important factor in the success of an installation; but it is not material whether the amplification be effected in a single amplifier or in two or more amplifiers. I have had excellent results with amplification in excess of 100 decibels gain.

It will be evident that any suitable material may be used for the chime, such as bell metal, bronze and non-magnetic iron.

It will be evident that the present invention offers an important contribution to the musical art, and in particular enlarges the scope and improves the character of chime tone reproduction.

It will be further evident that when the magnet is described as toroidal, this is intended as a general description of any suitable ring-like or hollow cylindrical construction, and not merely as limited to a circular or other cross section of the ring.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. The method of selecting and reproducing the natural sound from an electrically conducting nonmagnetic vibratory musical body while avoiding reproduction of other sounds, which consists in suspending the body from its top so as to permit free vibration by the body, in subjecting a narrow band of nonmagnetic body having a rate of vibration to be reproduced, to magnetic flux extending longitudinally of the body in axial planes to cause flow of electric current around within the band by reason of vibration of the body within the flux and in picking up the current within the band by induction.

2. The step in the method of producing electrical current for amplification and for reproduction as sound from an electrically conducting nonmagnetic musical vibrating body, free from dependence upon audio-acoustical manifestations, which consists in suspending the body from above, in utilizing the vibrations of a nonmagnetic member within a magnetic field of force to produce electric current circularly within the body and transforming the said electric currents in a separate circuit secondary to the current within the body as primary.

3. The method of transforming vibrations of an electrically conducting nonmagnetic musical vibrator into electric current for amplification and conversion into sound, which consists in suspending the vibrator from the top, in subjecting it to a magnetic field of force having its lines of force extending longitudinally of the vibrator whereby the vibrations of the vibrator fluctuantly vary the extent of inclusion of vibrator within the field, thus inducing electric current in the vibrator by cutting lines of force and in picking up the current in the vibrator by induction.

4. The method of producing alternating currents corresponding in frequency to the frequency of the vibrations of a selected part of an electrically conducting nonmagnetic vibrator, which consists in subjecting the selected part of the nonmagnetic body to a magnetic field limited to the selected portion, vibrating the body within the magnetic field to generate electric current within the body and picking up by induction the current generated.

5. In the method of reproducing and securing maximum purity of tone from a nonmagnetic tubular chime, the steps which consist in subjecting an antinode of a nonmagnetic chime to a field of magnetic force, confining the field of force closely to the antinode and its immediate vicinity and striking the chime, picking up by induction the current produced in the chime by vibration of the chime.

6. The method of producing alternating currents corresponding in frequency to the vibrations of an electrically conducting nonmagnetic chime, for use in a loud speaker and by means of a toroidal magnet and secondary coil, which consists in suspending a nonmagnetic chime from the top, in vibrating the nonmagnetic chime within the chime-looping field of the magnet and within the coil to generate circumferentially extending electric currents within the chime by fluctuating the position of the chime within the field and in picking up within the coil by induction the current so generated.

7. In the method of reproducing the sound from an electrically conducting nonmagnetic musical vibratory body and freeing from objectionable overtones, using a magnet and pick-up coil, the steps which consist in subjecting the face of the nonmagnetic body to a field of magnetic force in the presence of the pick-up coil located between the magnet and that face only, selecting for this purpose a portion of the body which is free from undesirable overtones.

8. The method of reproducing the sound of an electrically conducting nonmagnetic musical vibrator through the medium of a magnetic field, amplifier and loud speaker, which consists in vibrating the vibrator within the magnetic field to produce an electric current in the vibrator, picking up the electric current by induction in the feed circuit of the amplifier, transmitting the amplified current to the speaker and there reproducing the sound and using a part of the sound selectively to augment the vibration of the vibrator.

9. The steps in the method of augmenting musical sound, which consist in generating current within a nonmagnetic musical vibrator by the vibrations of the vibrator within a field comprising at that point lines of force nearly parallel with the surface of the vibrator as distinguished from generating by the sound which they produce and transforming the current.

10. In a musical system, a nonmagnetic, hollow, cylindrical, electrically conducting musical vibrator vibrating transversely of the length, a magnet adjacent the vibrator, and a pick-up coil close to the vibrator and between the vibrator and the magnet.

11. In a musical system, a nonmagnetic, electrically conducting musical vibrator accessible for striking and having vibration transversely of the length of the vibrator, a magnet adjacent the vibrator, and a pick-up coil close to the vibrator and to the magnet.

12. An electrically conducting nonmagnetic musical vibrator, a magnet having lines of force travelling within the space occupied by the vibrator and within planes generally longitudinal to the vibrator, within which field the vibrator acts as an armature and a pick-up coil close to the vibrator and in position to have current induced in it by current generated in the vibrator.

13. An electrically conducting nonmagnetic musical vibrating body, suspended from the top, a magnet within whose field of force the body vibrates, producing current in the body by the cutting of lines of force due to vibration and a pick-up coil between the magnet and the body forming a secondary to receive current by induction from the current in the body.

14. In a system for reproducing vibrations as sound, a nonmagnetic electrically conducting musical vibrator, a pick-up coil surrounding the vibrator, a magnet creating a toroidal field of force about the vibrator to include the vibrator.

15. A nonmagnetic tubular chime suspended from the top, a toroidal magnet surrounding the chime and including the chime within its toroidal field of force and a pick-up coil between the toroidal magnet and the chime acting as transformer secondary for current induced in the chime as primary.

16. A plurality of nonmagnetic tubular chimes suspended from the top, toroidal magnets, one surrounding each chime, pick-up coils, one each about the chimes, adjacent the magnets, an amplifier and loud speaker system, connections between the individual coils and the amplifier system and means providing adjustment of the position of the magnets and of the pick-up coils with respect to the magnets along the lengths of the chimes.

17. A plurality of nonmagnetic tubular chimes, toroidal magnets, one surrounding each chime, pick-up coils, one each about the chimes adjacent the magnets, an amplifier and loud speaker system, connections between the individual coils and the amplifier system and means providing adjustment of the position of the pick-up coils with respect to the magnets axially of the chimes.

18. A plurality of nonmagnetic tubular chimes, toroidal magnets, one surrounding each chime, pick-up coils, one each about the chimes, adjacent the magnets, an amplifier and loud speaker system, connections between the individual coils and the amplifier system and means providing adjustment of the positions of the magnets longitudinally of the chimes.

19. In a musical system, a nonmagnetic electrically conducting musical vibrator, a magnet adjacent the vibrator and a pick-up coil of pancake shape juxtaposed to the vibrator between it and the magnet.

20. In a nonmagnetic musical system, an electrically conducting nonmagnetic musical vibrator, a magnet adjacent the vibrator and a pick-up coil juxtaposed to one face only of the vibrator.

21. In a musical system, a nonmagnetic tubular chime vibrator, means for setting up a plurality of magnetic fields intercepting the chime vibrator at spaced points and a plurality of electric pick-up coils located at spaced points along the chime vibrator and common means for amplifying the currents from the coils.

22. In a musical system, a nonmagnetic chime vibrator, a magnet for setting up a magnetic field intercepting the chime vibrator and a pick-up coil for currents generated in the chime vibrator, and pick-up coil surrounding the magnet.

23. A tubular vibrator chime of nonmagnetic material, magnet means for setting up a field of magnetic force through the space occupied by the walls of the chime as distinguished from across the chime from side to side and a pick-up coil juxtaposed to the chime wall and within the field of force.

HERBERT K. NEUBER.